(12) United States Patent
Williams et al.

(10) Patent No.: US 8,921,503 B2
(45) Date of Patent: Dec. 30, 2014

(54) FOUL PREVENTING COATING COMPOSITION

(75) Inventors: David Neil Williams, Newcastle upon Tyne (GB); David Anthony Stark, Singapore (SG); Lyndsey Tyson, Newcastle upon Tyne (GB)

(73) Assignee: Akzo Nobel Coatings International B.V., Arnhem (NL)

(*) Notice: Subject to any disclaimer, the term of this patent is extended or adjusted under 35 U.S.C. 154(b) by 0 days.

(21) Appl. No.: 14/006,732

(22) PCT Filed: Mar. 28, 2012

(86) PCT No.: PCT/EP2012/055449
§ 371 (c)(1),
(2), (4) Date: Sep. 23, 2013

(87) PCT Pub. No.: WO2012/130861
PCT Pub. Date: Oct. 4, 2012

(65) Prior Publication Data
US 2014/0010853 A1    Jan. 9, 2014

Related U.S. Application Data

(60) Provisional application No. 61/474,855, filed on Apr. 13, 2011.

(30) Foreign Application Priority Data

Mar. 31, 2011 (EP) .................................... 11160561

(51) Int. Cl.
| | | |
|---|---|---|
| C08G 77/18 | (2006.01) | |
| C09D 5/16 | (2006.01) | |
| C08L 83/12 | (2006.01) | |
| C09D 183/12 | (2006.01) | |
| C08K 5/5333 | (2006.01) | |
| C08K 5/5317 | (2006.01) | |
| C08K 5/54 | (2006.01) | |
| C08G 77/46 | (2006.01) | |

(52) U.S. Cl.
CPC ............ *C09D 5/1675* (2013.01); *C08K 5/5317* (2013.01); *C08L 83/12* (2013.01); *C08K 5/5406* (2013.01); *C09D 183/12* (2013.01); *C08G 77/46* (2013.01); *C08K 5/5333* (2013.01)
USPC .......................................................... 528/23

(58) Field of Classification Search
CPC .... C09D 5/1675; C09D 183/12; C08G 77/46; C08K 5/5419; C08K 5/5317
USPC .................................................................. 528/23
See application file for complete search history.

(56) References Cited

U.S. PATENT DOCUMENTS

| | | | |
|---|---|---|---|
| 3,654,058 A | * | 4/1972 | Jasinski et al. ................. 442/249 |
| 3,702,778 A | | 11/1972 | Mueller et al. |
| 6,906,161 B2 | | 6/2005 | Sakamoto et al. |
| 2002/0086168 A1 | | 7/2002 | Sadvary et al. |
| 2004/0006190 A1 | | 1/2004 | Sakamato et al. |

FOREIGN PATENT DOCUMENTS

| | | |
|---|---|---|
| GB | 1307001 | 2/1973 |
| WO | WO 99/33927 | 7/1999 |
| WO | WO 2004/081121 | 9/2004 |
| WO | WO 2008/132196 | 11/2008 |

OTHER PUBLICATIONS

International Search Report and Written Opinion for International Application No. PCT/EP2012/055449 mailed on Jun. 29, 2012.
International Preliminary Report on Patentability for International Application No. PCT/EP2012/055449 mailed on Oct. 10, 2013.
European Search Report for Application No. 11160561.4 dated Jun. 8, 2011.

* cited by examiner

*Primary Examiner* — Kuo-Liang Peng
(74) *Attorney, Agent, or Firm* — Kenyon & Kenyon LLP

(57) ABSTRACT

The invention relates to a coating composition for use as a coating to prevent fouling in a marine environment, comprising: a) a curable polysiloxane polyoxyalkylene block copolymer; b) a catalyst of general formula (i) wherein each $R^1$ is independently a monovalent hydrocarbon group, each $R^2$ is independently selected from a hydrogen atom, a monovalent organic group, a siloxane group, or a silyl group of formula —$SiR^3{}_3$, wherein each $R^3$ is independently a monovalent hydrocarbon group, and n is an integer having a value of 0 or greater, and optionally: c) a filler and/or pigment.

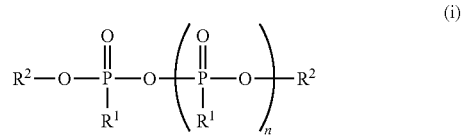

(i)

4 Claims, No Drawings

FOUL PREVENTING COATING COMPOSITION

REFERENCE TO RELATED APPLICATIONS

This application is the U.S. National Phase of PCT/EP2012/055449 filed on Mar. 28, 2012, and claims the benefit of EP Application No. 11160561.4, filed on Mar. 31, 2011, and U.S. Provisional Application No. 61/474,855, filed on Apr. 13, 2011.

This invention relates to a process to physically deter fouling from a substrate in an aquatic environment using a polyorganosiloxane-containing coating composition and a substrate coated with said coating composition.

Man-made structures such as boat hulls, buoys, drilling platforms, dry dock equipment, oil production rigs, and pipes which are immersed in water are prone to fouling by aquatic organisms such as green and brown algae, barnacles, mussels, and the like. Such structures are commonly of metal, but may also comprise other structural materials such as concrete. This fouling is a nuisance on boat hulls, because it increases frictional resistance during movement through the water, the consequence being reduced speeds and increased fuel costs. It is a nuisance on static structures such as the legs of drilling platforms and oil production rigs, firstly because the resistance of thick layers of fouling to waves and currents can cause unpredictable and potentially dangerous stresses in the structure, and, secondly, because fouling makes it difficult to inspect the structure for defects such as stress cracking and corrosion. It is a nuisance in pipes such as cooling water intakes and outlets, because the effective cross-sectional area is reduced by fouling, with the consequence that flow rates are reduced.

The commercially most successful methods of inhibiting fouling have involved the use of anti-fouling coatings containing substances toxic to aquatic life, for example tributyltin chloride or cuprous oxide. Such coatings, however, are being regarded with increasing disfavour because of the damaging effects such toxins may have if released into the aquatic environment. There is accordingly a need for non-fouling coatings which do not release markedly toxic materials.

It has been known for many years, for example as disclosed in GB 1,307,001 and U.S. Pat. No. 3,702,778, that silicone rubber coatings resist fouling by aquatic organisms. It is believed that such coatings present a surface to which the organisms cannot easily adhere, and they can accordingly be called fouling-release rather than anti-fouling coatings. Silicone rubbers and silicone compounds generally have very low toxicity. The disadvantage of this anti-fouling system when applied to boat hulls is that although the accumulation of marine organisms is reduced, relatively high vessel speeds are needed to remove all fouling species. Thus, in some instances, it has been shown that for effective release from a hull that has been treated with such a polymer, it is necessary to sail with a speed of at least 14 knots. For this reason silicone rubbers have gained limited commercial success and there is a need for improvement of the anti-fouling and fouling-release properties of these environmentally benign coatings.

U.S. Pat. No. 6,906,161 discloses a room-temperature curable antifouling coating composition comprising an organopolysiloxane with at least one side group of the formula —$R^2$—$Si(R^3)_2$—O—$(R^4O)_b$—$R^5$ bonded to a silicon atom within each molecule. In this formula, b is an integer from 1-30, $R^2$ and $R^3$ are hydrocarbon groups of 1-6 carbon atoms, $R^4$ is an alkylene group of 2-4 carbon atoms, and $R^5$ is a hydrocarbon group of 1-8 carbon atoms or a group represented by —$R^6$—$SiX^3$, wherein $R^6$ is a hydrocarbon group of 1-6 carbon atoms and X is a hydrolysable group.

WO 2004/081121 discloses an antifouling coating composition comprising a copolymer obtained by polymerising a monomer mixture comprising a Si-containing monomer having two (meth)acryl end groups and which contains a divalent metal atom.

WO 2008/132196 discloses a coating capable to physically deter fouling from a substrate in a aquatic fouling environment, which process comprises forming on the substrate, before exposure to the said environment, a coating composition comprising (i) a curable polyorganosiloxane polyoxyalkylene block copolymer having at least two reactive groups X situated on the polymer chain and (ii) an organosilicon crosslinking agent and/or a catalyst.

It has now been found that the physical deterrence of marine fouling can be further reduced, even under static conditions, by using the coating composition of the present invention. This coating composition comprises a) a polysiloxane polyoxyalkylene block copolymer;

b) a catalyst of general formula

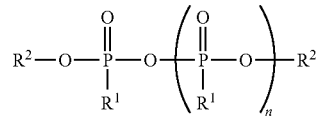

wherein each $R^1$ is independently a monovalent hydrocarbon group each $R^2$ is independently selected from a hydrogen atom, a monovalent organic group, a siloxane group, or a silyl group of formula —$SiR^3_3$, wherein each $R^3$ is independently a monovalent hydrocarbon group, and n is an integer having a value of 0 or greater and optionally c) a filler and/or pigment.

The present invention further relates to a process to physically deter fouling from a substrate in an aquatic fouling environment, which process comprises applying to the substrate, before exposure to the said environment, a coating composition comprising a) a polysiloxane polyoxyalkylene block copolymer;

b) a catalyst of general formula

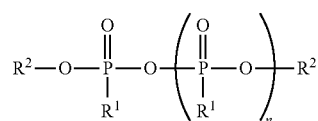

wherein each $R^1$ is independently a monovalent hydrocarbon group each $R^2$ is independently selected from a hydrogen atom, a monovalent organic group, a siloxane group, or a silyl group of formula —$SiR^3_3$, wherein each $R^3$ is independently a monovalent hydrocarbon group, and n is an integer having a value of 0 or greater, and optionally c) a filler and/or pigment.

The polysiloxane polyoxyalkylene block copolymer that is used in the present invention is curable; it has at least two reactive groups X situated on the polymer chain. If said groups X are not reactive with each other, the coating composition contains an organosilicon crosslinking agent having at least two groups Y reactive with the said groups X. In addition, it may also contain a catalyst in order to promote the reaction between the X and Y groups. If the polyorganosiloxane polyoxyalkylene copolymer has only two reactive groups X per molecule which are not reactive with each other, the coating composition contains an organosilicon crosslinking agent having on average more than two reactive groups Y per molecule.

This coating composition is applied to a substrate and cured to form a coated substrate. The resulting coating will consist of a water-insoluble hydrophilic polymer network comprising polyorganosiloxane polyoxyalkylene block copolymer chains linked to each other by bonds between crosslinking sites on the polyorganosiloxane polyoxyalkylene block copolymer chains and/or through an organosilicon crosslinking moiety which is bonded to crosslinking sites on the polyorganosiloxane polyoxyalkylene block copolymer chains. In a preferred embodiment, the crosslinks between the polyorganosiloxane polyoxyalkylene block copolymer chains are substantially free of Si—O—C linkages.

The Polyorganosiloxane Polyoxyalkylene Block Copolymer

Within this specification, a block copolymer is defined as an essentially linear copolymer with chains composed of homo-polymeric blocks which are linked together. These blocks can be linked in any fashion, e.g. alternating or random. Preferably, the polyorganosiloxane blocks present in the block copolymer contain, independent of each other, 5-30 siloxane units. More preferably, the polyoxyalkylene blocks contain, independent of each other, 2-30 oxyalkylene units.

A first preferred type of polyorganosiloxane polyoxyalkylene block copolymer is a polyorganosiloxane-terminated block copolymer of the form PS-(A-PO-A-PS)$_k$, wherein PS represents a polyorganosiloxane block, PO represents a polyoxyalkylene block, A represents a divalent moiety, and k is an integer that has a value of at least 1, for example, more than 1 and preferably 10-250.

Other block copolymers can be used, for example a branched block copolymer, a polyoxyalkylene-terminated block copolymer or a block copolymer having polyorganosiloxane and polyoxyalkylene terminal blocks. In a preferred embodiment, the reactive groups X are each situated on a silicon atom of the block copolymer, although this is not essential if the copolymer is used with an organosilicon crosslinking agent. Even more preferably, the reactive groups X are situated in a polyorganosiloxane block of the copolymer. The crosslinkable reactive groups X can for example be situated on terminal silicon atoms of a polyorganosiloxane block of the copolymer, particularly if the copolymer is of the form PS-(A-PO-A-PS)$_k$.

In one embodiment, the polyorganosiloxane polyoxyalkylene block copolymer has the form PS'-(A-PO-A-PS')$_k$, wherein PS' represents a polyorganosiloxane block terminated with an alkoxy-substituted silicon atom of the formula —Si(R')(R')—OR, wherein R represents an alkyl group having 1 to 4 carbon atoms and each R' represents an alkyl group having 1 to 6 carbon atoms, a phenyl group, or an alkoxy group of the formula —OR. Examples of such groups are trimethoxysilyl, triethoxysilyl, methyldiethoxysilyl, methyldimethoxysilyl, dimethylmethoxysilyl, and dimethylethoxysilyl.

A polyorganosiloxane polyoxyalkylene block copolymer of the form PS-(A-PO-A-PS)$_k$ can be prepared in a hydrosilylation reaction by reacting a polyorganosiloxane having two Si—H groups with a polyether containing two ethylenically unsaturated groups in an amount such that the Si—H groups are present in excess over the ethylenically unsaturated groups. By ethylenically unsaturated group we mean a group of the formula >CH=CH$_2$. The reaction is generally carried out in the presence of a hydrosilylation catalyst such as a platinum group metal or a compound thereof. The divalent moieties A resulting from such a hydrosilylation reaction are alkylene moieties, having for example 2 to 6 carbon atoms depending on the ethylenically unsaturated group of the polyether.

The polyorganosiloxane which is reacted with the polyether can be branched, but is preferably a linear polydiorganosiloxane having a degree of polymerisation (DP) of 2 to 250 siloxane units, more preferably 2 to 100 siloxane units, and most preferably 4 to 40 siloxane units. The organic groups of the polyorganosiloxane are preferably selected from phenyl groups and alkyl groups having 1 to 18, preferably 1 to 6 carbon atoms. Most preferably, at least 90% of the organic groups attached to Si are methyl groups; for example, the polyorganosiloxane is a Si—H functional polydimethylsiloxane. The polyorganosiloxane can contain more than two Si—H groups, but this is likely to lead to a branched polyorganosiloxane polyoxyalkylene copolymer. Most preferably, the polyorganosiloxane has only two Si—H groups, one at each end of the polydiorganosiloxane chain, so that reaction with the polyether produces a polyorganosiloxane-terminated block copolymer with reactive Si—H groups situated on the terminal silicon atoms of the polyorganosiloxane blocks of the copolymer, as shown in the reaction scheme below.

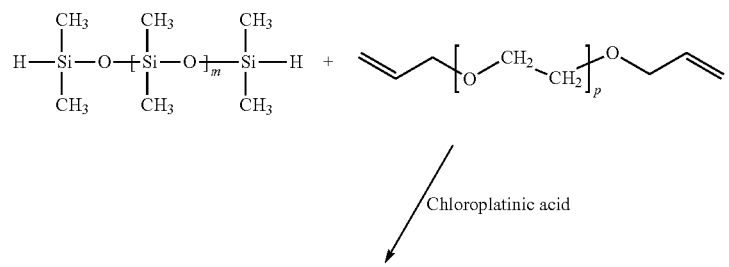

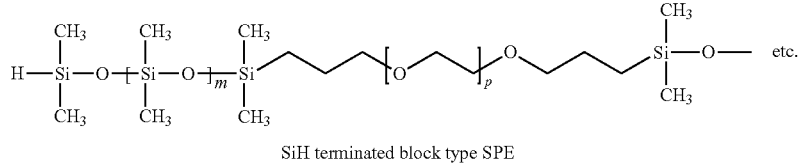

SiH terminated block type SPE

Polyorganosiloxanes having Si—H groups on non-terminal siloxane units, or on both terminal and non-terminal siloxane units, can alternatively be used.

In order to give the required hydrophilic properties, it is preferred that at least 50% of the polyoxyalkylene units in the polyoxyalkylene block are oxyethylene units. It is therefore preferred that the polyether used to prepare the polyorganosiloxane polyoxyalkylene block copolymer is a polyethylene oxide, although a poly(oxyethylene oxypropylene) copolymer having a majority of polyoxyethylene units can also be used. The ethylenically unsaturated groups of the polyether can for example be allyl, vinyl, hexenyl or isobutenyl groups. One example of a preferred polyether is polyethylene glycol diallyl ether. The polyethylene oxide preferably has a degree of polymerisation of 4 to 100, more preferably 4 to 40 oxyethylene units.

The molar ratio of oxyalkylene, for example oxyethylene, units to siloxane units in the polyorganosiloxane polyoxyalkylene copolymer preferably is in the range of 0.05:1 to 0.5:1.

The Si—H-functional polyorganosiloxane and the polyether containing ethylenically unsaturated groups are preferably reacted in a molar ratio of Si—H groups to ethylenically unsaturated groups in the range of 1.5:1 to 6:1, more preferably 2:1 to 4:1. The reaction can be carried out at ambient temperature, but an elevated temperature in the range 60 to 200° C., for example 100 to 150° C., may be preferred. The reaction is generally carried out in the presence of a catalyst comprising a platinum group metal such as platinum or rhodium. One preferred platinum catalyst is hexachloroplatinic acid or a reaction product of chloroplatinic acid and an organosilicon compound containing terminal aliphatic unsaturation; another is a platinum divinyl tetramethyl disiloxane complex. The catalyst is preferably used in amounts from 0.00001-0.5 parts platinum or rhodium per 100 weight parts of the Si—H-functional polyorganosiloxane, most preferably 0.00001-0.002 parts.

The Si—H-functional polyorganosiloxane and the polyether containing ethylenically unsaturated groups can alternatively be reacted using a molar excess of the polyether containing ethylenically unsaturated groups, for example at a molar ratio of Si—H groups to ethylenically unsaturated groups in the range of 1:1.5 to 1:6, thereby producing a block copolymer of the form PO-(A-PS-A-PO)$_k$, wherein PO, PS and A are defined as above and the PO blocks have terminal ethylenically unsaturated groups. Such a block copolymer can be crosslinked by an organosilicon crosslinking agent having reactive Si—H groups, for example poly(methyl hydrogen siloxane) or a methyl hydrogen siloxane dimethylsiloxane copolymer, to produce a water-insoluble hydrophilic polymer network according to the invention. Alternatively, the terminal ethylenically unsaturated groups can be reacted with a suitable silane to convert them into reactive groups X.

The Organosilicon Crosslinking Agent

As mentioned above, if the groups X situated on a polyorganosiloxane block of the copolymer are not reactive with each other, the coating composition used in the present invention requires the presence of an organosilicon crosslinking agent having at least two groups Y reactive with the said groups X. In addition, the composition may contain a catalyst.

If the polyorganosiloxane polyoxyalkylene block copolymer has only two reactive groups X per molecule, the composition contains an organosilicon crosslinking agent having on average more than two reactive groups Y per molecule, for example 2.5 to 6 reactive groups per molecule, to aid network formation (crosslinking) rather than only chain extension. For example, if the organosilicon crosslinking moiety is a branched polyorganosiloxane containing at least three reactive groups Y, it can become bonded to at least three polymer chains.

Examples of suitable groups X are Si—H groups, Si-alkoxy groups, silanol groups, amine groups, carboxylic acid groups, thiol groups, epoxy groups, ketoxime groups, acetoxy groups, and ethylenically unsaturated groups.

Groups Y that are reactive with one or more of these groups X can be selected from the same list, the choice being dependent on their respective reactivity with the selected group X.

when the Groups X are Si—H Groups

If the reactive groups X are Si—H groups, the organosilicon crosslinking agent can contain ethylenically unsaturated groups Y. Such an organosilicon crosslinking agent preferably is a polysiloxane. The polysiloxane can for example consist of siloxane units selected from Q units of the formula $(SiO_{4/2})$, T units of the formula $R^cSiO_{3/2}$, D units of the formula $R^b{}_2SiO_{2/2}$, and M units of the formula $R^a{}_3SiO_{1/2}$, wherein the $R^a$, $R^b$, and $R^c$ substituents are selected from alkyl and alkenyl groups having 1 to 6 carbon atoms, at least three $R^a$, $R^b$ and/or $R^c$ substituents being alkenyl units.

If the polyorganosiloxane polyoxyalkylene block copolymer is of the form PS-(A-PO-A-PS)$_k$, wherein the reactive Si—H groups X are situated on the terminal silicon atoms of the polyorganosiloxane blocks, one suitable type of crosslinking agent is a branched polyorganosiloxane having ethylenically unsaturated groups Y situated on at least three branches. Such a branched polyorganosiloxane generally comprises Q and/or T units, M units and optionally D units. The alkenyl groups are preferably present in M units. The polyorganosiloxane can for example be a branched siloxane comprising one or more Q units of the formula $(SiO_{4/2})$, from 0 to 250 D units of the formula $R^b{}_2SiO_{2/2}$, and M units of the formula $R^aR^b{}_2SiO_{1/2}$, wherein the $R^a$ and $R^b$ substituents are selected from alkyl and alkenyl groups having 1 to 6 carbon atoms, at least three $R^a$ substituents in the branched siloxane being alkenyl units. If the polyorganosiloxane polyoxyalkylene block copolymer is of relatively high chain length, a low molecular weight Q-branched siloxane crosslinking agent may be preferred, for example a vinyl-functional Q-branched siloxane comprising a Q unit, four dimethylvinylsilyl M units, and 0 to 20 dimethylsiloxane D units, which may have the formula:

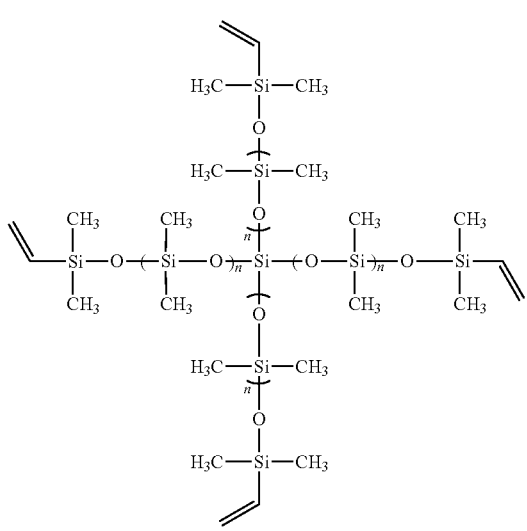

If the polyorganosiloxane polyoxyalkylene block copolymer contains more than two Si—H groups, the organosilicon crosslinking agent need not contain more than two ethylenically unsaturated groups. For example, the crosslinking agent can be a polydiorganosiloxane containing two ethylenically unsaturated groups such as a dimethylvinylsilyl-terminated polydimethylsiloxane, or it can be a mixture of such a polydiorganosiloxane containing two ethylenically unsaturated groups with a branched polyorganosiloxane having ethylenically unsaturated groups Y situated on at least three branches.

If the polyorganosiloxane polyoxyalkylene block copolymer contains reactive groups X which are Si—H groups and the organosilicon crosslinking agent contains ethylenically unsaturated groups Y, they are generally reacted in the presence of a catalyst comprising a platinum group metal such as platinum or rhodium. Preferred platinum catalysts are as described above. The catalyst is preferably used in amounts from 0.00001-0.5 parts platinum or rhodium per 100 weight parts of the Si—H-functional polyorganosiloxane polyoxyalkylene block copolymer. The polyorganosiloxane polyoxyalkylene block copolymer containing Si—H groups and the organosilicon crosslinking agent are preferably reacted in a molar ratio of Si—H groups to ethylenically unsaturated groups in the range of 1.5:1 to 6:1, more preferably 2:1 to 4:1. The crosslinking reaction can be carried out at ambient temperature but proceeds faster at an elevated temperature in the range of 60 to 200° C.

Because the crosslinking reaction proceeds at ambient temperature when the polyorganosiloxane polyoxyalkylene block copolymer containing Si—H groups, the crosslinking agent containing ethylenically unsaturated groups, and the catalyst are all in contact, it may be preferred to package a curable coating composition based on such reactive groups in two containers, so that the polyorganosiloxane polyoxyalkylene block copolymer, the crosslinking agent, and the catalyst are not all together in the same package. The contents of the two containers can be mixed shortly before application. For example, the catalyst can be packaged with the crosslinking agent containing ethylenically unsaturated groups, the polyorganosiloxane polyoxyalkylene block copolymer containing Si—H groups being in a separate container. Alternatively, the polyorganosiloxane polyoxyalkylene block copolymer and the crosslinking agent can be packaged together, and the catalyst can be packed separately, optionally with part of the polyorganosiloxane polyoxyalkylene block copolymer component or part of the crosslinking agent component.

When the Groups X are Si-Alkoxy or Silanol Groups

If the reactive groups X are Si-alkoxy groups, they can react with (i) each other in the presence of moisture and a catalyst or (ii) the reactive groups Y on the crosslinking agent, if present, being either Si-alkoxy or silanol groups.

If the reactive groups X are silanol groups, they can react with the reactive groups Y on the crosslinking agent selected from alkoxy, acetoxy, ketoxime, amide or hydroxyl groups bonded to silicon.

The coating can thus comprise polyorganosiloxane polyoxyalkylene block copolymer chains linked to each other through Si—O—Si linkages derived from Si-alkoxy crosslinking sites on the ends of the polyorganosiloxane polyoxyalkylene block copolymer chains.

The reactive groups X on the polyorganosiloxane polyoxyalkylene block copolymer can for example be present in groups of the formula —Si(R')$_2$—OR, wherein R represents a hydrogen or alkyl group having 1 to 4 carbon atoms and each R' represents an alkyl group having 1 to 6 carbon atoms, a phenyl group, or an alkoxy group of the formula —OR. Examples of such groups are trimethoxysilyl, triethoxysilyl, methyldiethoxysilyl, methyldimethoxysilyl, dimethylmethoxysilyl, and dimethylethoxysilyl.

The reactive groups Y on the crosslinking agent can also be present in groups of the formula —Si(R')$_2$(OR), wherein R and R' have the meanings given above. In its simplest form the crosslinking agent can be a tetraalkyl orthosilicate such as tetramethyl, tetraethyl, tetrapropyl, or tetrabutyl orthosilicate, a trialkoxysilane, for example an alkyltrialkoxysilane such as methyltrimethoxysilane, methyltriethoxysilane, ethyltriethoxysilane or n-octyltriethoxysilane, or a dialkoxysilane, for example a dialkyldimethoxysilane such as dimethyldimethoxysilane, or a dialkyldiethoxysilane such as dimethyldiethoxysilane.

If the polyorganosiloxane polyoxyalkylene block copolymer contains only two Si-bonded alkoxy groups, the organosilicon crosslinking agent should contain more than two Si-bonded alkoxy groups; for example, it can be a trialkoxysilane or a polysiloxane containing at least one —Si(OR)$_3$ unit, wherein R is defined as above, a polysiloxane containing at least two —Si(R")(OR)$_2$ units, or a polysiloxane containing at least three —Si(R")$_2$(OR) units, wherein R" is an alkyl group having 1 to 6 carbon atoms.

If the polyorganosiloxane polyoxyalkylene block copolymer contains more than two Si-bonded alkoxy groups, an organosilicon crosslinking agent containing only two Si-bonded alkoxy groups and/or an organosilicon crosslinking agent containing more than two Si-bonded alkoxy groups can be used. Alternatively, such a polyorganosiloxane polyoxyalkylene block copolymer containing more than two Si-bonded alkoxy groups can be cured by reaction of the Si-alkoxy groups with each other in the presence of moisture, and preferably a condensation catalyst, without need for a further crosslinking agent.

A polyorganosiloxane polyoxyalkylene block copolymer containing more than two Si-bonded alkoxy groups is a self-crosslinkable polymer which can cure to a water-insoluble hydrophilic polymer network. An example of such a copolymer is a polyorganosiloxane polyoxyalkylene block copolymer terminated with —Si(R'$_2$)(OR)$_2$units, wherein R and R' are defined as above. For example, a block copolymer of the form PS-(A-PO-A-PS)$_n$, wherein the reactive Si(R')(OR)$_2$ units are situated on the terminal silicon atoms of the polyorganosiloxane blocks.

The polyorganosiloxane polyoxyalkylene block copolymer containing Si-bonded alkoxy groups can alternatively be a block copolymer of the form PO-(A-PS-A-PO)n. Such a block copolymer having terminal ethylenically unsaturated groups can be prepared as described above and can be reacted with a silane of the formula H—Si(R')$_2$(OR), wherein R and R' are defined as above, to convert the ethylenically unsaturated groups into reactive groups of the formula —Si(R')$_2$(OR) containing 1, 2 or 3 reactive alkoxy groups each attached to a silicon atom in the polyorganosiloxane polyoxyalkylene block copolymer. Examples of such silanes are trimethoxysilane, triethoxysilane, methyldiethoxysilane, and dimethylethoxysilane.

Usually, it is preferred that the crosslinking agent, if used, is an organopoly-siloxane, for example a polydiorganosiloxane such as polydimethylsiloxane having end units of the formula —Si(R')$_2$(OR), particularly such end units where at least one of the R' groups is an alkoxy group, or a branched polyorganosiloxane in which each branch is terminated with a group of the formula —Si(R')$_2$(OR). It will be appreciated that some crosslinking between polyorganosiloxane polyoxyalkylene block copolymer chains terminated with reactive groups of the formula —Si(R')$_2$(OR) may take place even when a crosslinking agent is present. It may be preferred to use a minor amount of crosslinking agent to control the properties of the cured polymer composition. For example, a branched polyorganosiloxane containing Si-alkoxy groups can be added to increase the degree and/or density of the crosslinks, leading to a harder cured polymer composition. A silanol or alkoxy-terminated polydiorganosiloxane of relatively high chain length, for example polydimethyl-siloxane of DP 100 up to 250 or even 500, can be added to decrease the crosslink density, leading to a more flexible cured polymer composition. The overall proportion of alkoxy-functional polyorganosiloxane polyoxyalkylene copolymer to other alkoxy-functional polyorganosiloxane(s) can be any value in the range of 100:0 to 1:99.

The Si-alkoxy groups react with each other in the presence of moisture to form Si—O—Si linkages. This reaction can proceed, even at ambient temperature, without a catalyst, but proceeds much more rapidly and also improved non-fouling results are found, if a condensation cure phosphonate catalyst is used of the general formula (i)

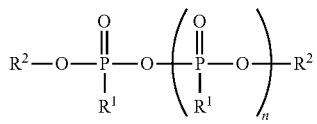

wherein
each R$^1$ is independently a monovalent hydrocarbon group,
each R$^2$ is independently selected from a hydrogen atom, a monovalent organic group, a siloxane group, or a silyl group of formula —SiR$^3$$_3$, wherein each R$^3$ is independently a monovalent hydrocarbon group, and
n is an integer having a value of 0 or greater.

Alternatively, in the general formula (i) above, each group R$^1$ is independently a monovalent hydrocarbon group; and each R$^2$ is independently a hydrogen atom, a monovalent hydrocarbon group, or a silyl group. Examples of monovalent hydrocarbon groups for R$^1$, R$^2$, and R$^3$ include, but are not limited to, alkyl such as methyl, ethyl, propyl, pentyl, hexyl, heptyl, ethylhexyl, octyl, decyl, dodecyl, undecyl, and octadecyl; alkenyl such as vinyl, allyl, propenyl, and hexenyl; cycloalkyl such as cyclopentyl and cyclohexyl; aryl such as phenyl, tolyl, and xylyl; alkaryl such as benzyl; and aralkyl such as 2-phenylethyl. Subscript n may have a value ranging from 0 to 50, alternatively 0 to 20. Alternatively, when ingredient (R) is a monomeric phosphonate, subscript n has a value of 0. Alternatively, each R$^1$ is independently an alkyl group of 1 to 8 carbon atoms or an alkenyl group of 1 to 8 carbon atoms; and each R$^2$ is independently a hydrogen atom, an alkyl group of 1 to 4 carbon atoms, or a silyl group in which each R$^3$ is independently an alkyl group of 1 to 4 carbon atoms. Examples of suitable alkyl groups for R$^1$ and R$^2$ and R$^3$ are methyl, ethyl, propyl, butyl, hexyl, ethylhexyl, and octyl. Alternatively, each R$^1$ and each R$^3$ may be independently selected from methyl, vinyl, and octyl. Alternatively, each R$^2$ may be independently selected from a hydrogen atom or a silyl group. Alternatively, each R$^2$ may be independently selected from a hydrogen atom or an organic group. Alternatively, each R$^2$ may be independently selected from a hydrogen atom or a monovalent hydrocarbon group, such as alkyl or alkenyl; alternatively alkyl.

One skilled in the art would recognize that average formula (i) can represent an equilibrium mixture of species, where at least some of the molecules of formula (i) present contain a silyl group and some of the molecules of formula (i) do not contain a silyl group.

Alternatively, ingredient (R) may comprise diethenyldiphosphonic acid, vinylphosphonic acid, bis(trimethylsilyl) vinylphosphonate, trimethylsilyl vinylphosphonic acid, bis(dimethylvinylsilyl)vinylphosphonate, dimethylvinylsilyl vinylphosphonic acid, dimethyl methylphosphonate, bis(trimethylsilyl)octylphosphonate, trimethylsilyl octylphosphonate, octylphosphonic acid, or a combination thereof. Alternatively, ingredient (R) may comprise a mixture of bis (trimethylsilyl) octylphosphonate, trimethylsilyl octylphosphonate, and octylphosphonic acid.

Phosphonates are commercially available. For example, DOW CORNING® 4-6085 is a mixture comprising monomeric silyl phosphonate and monomeric organic phosphonate species; DOW CORNING® 4-6025 is a mixture comprising monomeric and polymeric phosphonate species; and DOW CORNING® 4-6035 is also a commercially available phosphonate. These phosphonates are all available from Dow Corning Corporation of Midland, Mich., U.S.A. Dimethyl methylphosphonate is also commercially available.

The amount of the phosphonate catalyst that is present in the coating composition can for example be 0.01-2%, based on the weight of polyorganosiloxane polyoxyalkylene copolymer plus crosslinking agent.

Since a polyorganosiloxane polyoxyalkylene block copolymer having Si-alkoxy groups and a crosslinking agent having Si-alkoxy groups do not react in the absence of moisture, even in the presence of a catalyst, a curable composition based on them can be stored in a single container, provided that the reagents are dry and the container is moisture-proof. Upon opening of the container, the curable composition can be applied to a surface and will generally cure in the presence of atmospheric moisture. Curing proceeds rapidly at ambient temperature in the presence of a catalyst.

One type of curable composition according to the invention comprises a polyorganosiloxane polyoxyalkylene block copolymer containing Si-alkoxy groups, optionally a crosslinking agent having Si-alkoxy groups, and a siloxane condensation catalyst, the composition being packed in a moisture-proof container.

Although the hydrosilylation reaction to produce a polyorganosiloxane polyoxyalkylene block copolymer terminated with reactive Si—H groups can be carried out readily under factory conditions, systems based on such copolymers do not give fast curing at ambient temperature. It may therefore be preferred to convert the Si—H terminated polyorganosiloxane polyoxyalkylene copolymer into a copolymer terminated with another reactive group. The Si—H groups can in general be reacted with a compound containing an ethylenically unsaturated group which reacts with the Si—H group and another reactive group, such as Si-alkoxy, which is not reactive with Si—H but forms the reactive groups X of the resulting polymer. For example, reactive groups of the formula —Si(R')$_2$(OR), wherein R and R' have the meanings given above, can be introduced into a Si—H functional copolymer, for example by reaction with an ethylenically unsaturated alkoxysilane of the formula Z—Si(R')$_2$(OR), wherein Z is an ethylenically unsaturated group such as vinyl, allyl, isobutenyl or 5-hexenyl. Examples of such ethylenically unsaturated alkoxysilanes are vinyl trimethoxysilane, allyl trimethoxysilane and methylvinyl dimethoxysilane.

If the Si—H terminated polyorganosiloxane polyoxyalkylene block copolymer is of the formula PS-(A-PO-A-PS)$_k$ as defined above, a polyorganosiloxane polyoxyalkylene block copolymer of the form PS'-(A-PO-A-PS')$_k$, wherein PS' represents a polyorganosiloxane block terminated with an alkoxy-substituted silicon atom of the formula —Si(R')$_2$(OR), PO represents a polyoxyalkylene block, A represents a divalent moiety, and k has a value of at least 1 can be produced. The reaction of the Si—H terminated polyorganosiloxane polyoxyalkylene block copolymer with the ethylenically unsaturated alkoxysilane can be carried out using the same catalysts and reaction conditions as described above for the reaction of a Si—H terminated polyorganosiloxane with an ethylenically unsaturated polyether.

The crosslinking agent, if used, can also be prepared by a hydrosilylation reaction. For example, a Si—H terminated polyorganosiloxane can be reacted with an ethylenically unsaturated alkoxysilane. Alternatively, a polyorganosiloxane containing ethylenically unsaturated groups can be reacted with a polysiloxane containing a Si—H group and at least one Si-alkoxy group.

A polyorganosiloxane polyoxyalkylene copolymer terminated with reactive groups of the formula Si(R')(OR)$_2$ has 2 or 3 reactive Si-bonded alkoxy groups at each end of the copolymer chain. It does not need to be reacted with a highly functional or branched crosslinker to form a network. The crosslinker used with such a polyorganosiloxane polyoxyalkylene copolymer can for example be a polydiorganosiloxane, for example a polydimethylsiloxane, terminated with Si-alkoxy groups such as groups of the formula —Si(R')(OR)$_2$.

Such an alkoxy-terminated polydiorganosiloxane can be prepared by reaction of a Si—H terminated polydiorganosiloxane with an ethylenically unsaturated alkoxysilane of the formula Z—Si(R')(OR)$_2$ in the presence of a platinum group metal catalyst. The polydiorganosiloxane can for example be a polydimethylsiloxane with a DP in the range of 4 to 500 siloxane units.

The crosslinking agent for the polyorganosiloxane polyoxyalkylene copolymer terminated with reactive groups of the formula —Si(R')(OR)$_2$ can alternatively or additionally comprise a branched polyorganosiloxane containing —Si(R')$_2$(OR) groups, wherein R and R' are defined as above. The branched polyorganosiloxane can for example be a Q-branched polysiloxane in which each branch is terminated with a —Si(R')$_2$(OR) group. Such branched polyorganosiloxanes can be formed by the reaction of an ethylenically unsaturated branched polyorganosiloxane, for example the vinyl-functional Q-branched siloxane described above, with a short chain polysiloxane containing a Si—H group and a group of the formula —Si(R')$_2$(OR), for example a polysiloxane of the formula

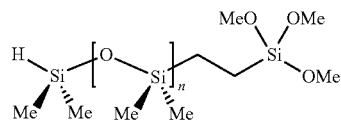

in the presence of a platinum group metal catalyst. The branched polyorgano-siloxane crosslinking agent can alternatively be prepared from a branched polyorganosiloxane containing Si—H groups, for example a Q-branched polysiloxane having terminal dimethyl hydrogen silyl groups, with an ethylenically unsaturated alkoxysilane of the formula Z—Si(R')(OR)$_2$.

It may be preferred to use a mixture of an alkoxy-terminated polydiorganosiloxane with an alkoxy-terminated Q-branched polysiloxane.

Additional Ingredients

The coating composition according to the present invention optionally comprises a filler and/or pigment and may further comprise one or more dyes, moisture scavengers, thixotropes, and unreactive fluids.

Examples of suitable fillers are barium sulphate, calcium sulphate, calcium carbonate, silicas or silicates (such as talc, feldspar, and china clay), aluminium paste/flakes, bentonite or other clays. Some fillers such as fumed silica may have a thixotropic effect on the coating composition. The proportion of fillers may be in the range of from 0 to 25 wt %, based on the total weight of the coating composition. Preferably the clay is present in an amount of from from 0 to 1 wt % and preferably the thixotrope is present in an amount of from 0 to 5 wt %, based on the total weight of the coating composition.

Examples of other suitable fillers include solid silicone resins, which are generally condensed branched polysiloxanes, such as a silicone resin comprising Q units of the formula SiO$_{4/2}$ and M units of the formula R'''$_3$SiO$_{1/2}$, wherein the R''' substituents are selected from alkyl groups having 1 to 6 carbon atoms and the ratio of M units to Q units is in the range of 0.4:1 to 1:1. Some fillers, such as fumed silica, may have a thixotropic effect on the coating composition.

Examples of pigments include black iron oxide, red iron oxide, yellow, iron oxide, titanium dioxide, zinc oxide, carbon black, graphite, red molybdate, yellow molybdate, zinc sulfide, antimony oxide, sodium aluminium sulfosilicates, quinacridones, phthalocyanine blue, phthalocyanine green, black iron oxide, indanthrone blue, cobalt aluminium oxide, carbazoledioxazine, chromium oxide, isoindoline orange, bis-acetoaceto-tolidiole, benzimidazolone, quinaphthalone yellow, isoindoline yellow, tetrachloroisoindolinone, and quinophthalone yellow, metallic flake materials (e.g. aluminium flakes), or other so-called barrier pigments or anti-corrosive pigments such as zinc dust or zinc alloys. The pigment volume concentration preferably is in the range of 0.5-25%. The proportion of pigments may be in the range of from 0 to 25 wt %, based on the total weight of the coating composition.

Suitable unreactive fluids are silicone oils such as methylphenyl silicone oil, petroleum oils, polyolefin oils, polyaromatic oils, fluoro resins such as polytetra-fluoroethylene or fluid fluorinated alkyl- or alkoxy-containing polymers, or combinations thereof. A preferred unreactive fluid is methylphenyl silicone oil. The proportion of unreacted fluid is preferably 5-25 wt %, more preferably 5-10 wt %, based on the solids content of the coating composition.

Suitable solvents include aromatic hydrocarbons, alcohols, ketones, esters, and mixtures of the above with one another or an aliphatic hydrocarbon. Preferable solvents include methyl isoamyl ketone and/or xylene.

The coating composition preferably has a solids content, defined as the weight percentage of involatile material, of 35 wt %, more preferably at least 50 wt %, even more preferably at least 70 wt %. The solids content can range up to 100 wt %, preferably up to 95 wt %, more preferably up to 90 wt %, and most preferably up to 80 wt %.

The Coating

The coating composition according to the present invention allows the formation of a cured coating that is essentially water-insoluble and has hydrophilic properties.

The thickness of the coating layer when dry is preferably in the range of 50 to 400 microns, more preferably in the range of 75 to 250 microns, and most preferably 100 to 200 microns.

The coating is especially suitable to physically deter fouling by aquatic organisms such as algae, barnacles, and mussels on underwater structures, such as ships' hulls, cooling water inlets of power stations, fish farming equipment, and the underwater and splash-zone surfaces of oil production platforms.

In one embodiment, the coating composition comprising the polysiloxane polyoxyethylene block copolymer and the phosphonate catalyst is applied over a coating composition comprising an acrylic methoxy functional thermoplastic coating. Such thermoplastic coating compositions are described in WO 99/33927 and can, for example, be obtained by mixing an acrylic polymer, xylene, bentone, talc, iron oxide, aluminium flake and methyl isobutyl ketone. The acrylic polymer can be obtained by reacting methoxyethylacrylate, methylmethacrylate, trimethoxysilylpropylmethacrylate, and mercaptopropyltrimethoxy silane at elevated temperature or by reacting butylacrylate, methylmethacrylate, and triisopropoxysilylpropylmethacrylate at elevated temperature. In this way a substrate is obtained coated with a first layer of the acrylic methoxy functional thermoplastic coating and a second layer of the polysiloxane polyoxyethylene block copolymer coating composition.

The invention will now be elucidated with reference to the following examples. These are intended to illustrate the invention but are not to be construed as limiting in any manner the scope thereof.

EXAMPLE 1

Coating Composition 1 was Prepared by Mixing the Following Ingredients

| Component | Parts by weight |
| --- | --- |
| Condensation cure Polysiloxane polyoxyethylene block copolymer | 81.3 |
| silica | 7.2 |
| Sodium Alumino Sulphosilicate | 7.0 |
| xylene | 4.1 |
| Octyl Silyl Phosphonate | 0.5 |

EXAMPLE 2

Coating Composition 2 was Prepared by Mixing the Following Ingredients

| Component | Parts by weight |
| --- | --- |
| Condensation cure Polysiloxane polyoxyethylene block copolymer | 81.3 |
| silica | 7.2 |
| Sodium Alumino Sulphosilicate | 7.0 |
| 2,4-pentanedione | 4.1 |
| Dibutyl Tin Dilaurate | 0.5 |

For comparison, for coating composition 3 Intersleek® 900, a product available from International Paint was taken.

All products were applied to plywood panels, cured at room temperature (15-20° C. at 30-80% relative humidity) for at least 6 hours and after curing immersed in a static fouling rig at Newton Ferrers (UK). The total fouling on these panels was assessed at certain time intervals after immersion. The results of these assessments are given in the table below

TABLE

Results of fouling assessment in static immersion test.

| Example | Time of Immersion (weeks) | Total Fouling (%) |
| --- | --- | --- |
| Coating composition 1 | 45 | 6.17 |
| Coating composition 2* | 45 | 24.27 |
| Coating composition 3* | 45 | 14.21 |
| Coating composition 1 | 84 | 18.67 |
| Coating composition 2* | 84 | 35.68 |
| Coating composition 3* | 84 | 24.46 |
| Coating composition 1 | 110 | 23.96 |
| Coating composition 2* | 110 | 64.02 |
| Coating composition 3* | 110 | 66.00 |

*Comparative example

The invention claimed is:

1. A process to physically deter fouling from a substrate in an aquatic fouling environment, the process comprising applying to the substrate, before exposure to the aquatic fouling environment, a coating composition comprising
   a) a curable polysiloxane polyoxyalkylene block copolymer; and
   b) a catalyst of general formula

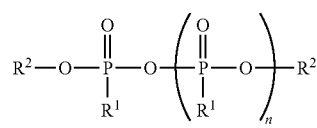

wherein
   each $R^1$ is independently a monovalent hydrocarbon group
   each $R^2$ is independently selected from a hydrogen atom, a monovalent organic group, a siloxane group, or a silyl group of formula $-SiR^3_3$, wherein each $R^3$ is independently a monovalent hydrocarbon group, and
   n is an integer having a value of 0 or greater.

2. The process according to claim 1, wherein the curable polysiloxane polyoxyalkylene block copolymer has the form PS'-(A-PO-A-PS')$_k$, wherein PS' represents a polyorganosiloxane block terminated with an alkoxy-substituted silicon atom of the formula —Si(R')(R')—OR, wherein R represents an alkyl group having 1 to 4 carbon atoms and each R' represents an alkyl group having 1 to 6 carbon atoms, a phenyl group, or an alkoxy group of the formula —OR;

A represents a divalent moiety;

PO represents a polyoxyalkylene block; and k is an integer that has a value of at least 1.

3. The process according to claim 1, wherein the coating composition further comprises:

c) at least one of a filler or a pigment.

4. The process according to claim 2, wherein the coating composition further comprises:

c) at least one of a filler or a pigment.

\* \* \* \* \*